(12) United States Patent
Porter

(10) Patent No.: US 10,808,744 B2
(45) Date of Patent: Oct. 20, 2020

(54) METHOD FOR INJECTION MOLDED RIVET STYLE FASTENER AND HOUSING WITH SNAP ASSEMBLY FUNCTIONALITY ALONG WITH AN INJECTION MOLDING PROCESS FOR PRODUCING SUCH A RIVET WITHOUT AN UNDERCUT FEATURE

(71) Applicant: U.S. Farathane Corporation, Auburn Hills, MI (US)

(72) Inventor: Steve Porter, Auburn Hills, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 0 days.

(21) Appl. No.: 16/394,165

(22) Filed: Apr. 25, 2019

(65) Prior Publication Data
US 2019/0249702 A1    Aug. 15, 2019

Related U.S. Application Data

(63) Continuation-in-part of application No. 15/409,839, filed on Jan. 19, 2017, now abandoned.
(Continued)

(51) Int. Cl.
*F16B 21/08* (2006.01)
*F16B 19/00* (2006.01)
(Continued)

(52) U.S. Cl.
CPC ............ *F16B 21/08* (2013.01); *B21J 15/04* (2013.01); *F16B 19/002* (2013.01);
(Continued)

(58) Field of Classification Search
CPC ........ F16B 21/08; F16B 19/02; F16B 19/004; F16B 19/08; F16B 21/088; F16B 21/086;
(Continued)

(56) References Cited

U.S. PATENT DOCUMENTS

| 2,426,326 A | 8/1947 | Tooms |
| 2,709,290 A | 5/1955 | Rosenthal |

(Continued)

FOREIGN PATENT DOCUMENTS

| EP | 1217229 A2 | 6/2002 |
| FR | 1255864 A | 3/1961 |

(Continued)

*Primary Examiner* — Jermie E Cozart
(74) *Attorney, Agent, or Firm* — Dinsmore & Shohl LLP

(57) ABSTRACT

A method for producing and installing a fastener, including the steps of forming an engaging portion having a projecting stem which is interiorly hollowed over at least an intermediate extending range, the stem including a solid end most extending portion, and forming a receiving portion having a surface, within which is configured an inner rim defined edge, a diameter of an aperture between said rim edge being less than a diameter of the stem. Additional steps include pressing the solid end most extending portion of the engaging portion through the inner rim edge of the receiving portion and aligning with the inner rim edge a location of the interiorly hollowed portion of the stem, causing inward collapsing of the aligned location by the rim edge to secure the engaging portion to the receiving portion.

13 Claims, 10 Drawing Sheets

US 10,808,744 B2
Page 2

Related U.S. Application Data

(60) Provisional application No. 62/322,645, filed on Apr. 14, 2016.

(51) Int. Cl.
  *B21J 15/04* (2006.01)
  *F16B 19/08* (2006.01)
  *F16B 21/07* (2006.01)
  *F16B 19/02* (2006.01)
  *B21J 15/06* (2006.01)

(52) U.S. Cl.
  CPC ............ *F16B 19/004* (2013.01); *F16B 19/08* (2013.01); *B21J 15/06* (2013.01); *F16B 19/02* (2013.01); *F16B 19/086* (2013.01); *F16B 21/073* (2013.01); *F16B 21/088* (2013.01); *Y10T 29/49837* (2015.01); *Y10T 29/49956* (2015.01)

(58) Field of Classification Search
  CPC ....... F16B 21/073; F16B 19/002; B21J 15/04; B21J 15/06; Y10T 29/49837; Y10T 29/49956
  See application file for complete search history.

(56) References Cited

U.S. PATENT DOCUMENTS

| | | |
|---|---|---|
| 2,780,128 A | 2/1957 | Rapata |
| 2,791,366 A | 5/1957 | Geisler |
| 3,118,644 A | 1/1964 | Werning |
| 3,168,961 A | 2/1965 | Yates |
| 3,200,694 A | 8/1965 | Rapata |
| 3,307,731 A | 3/1967 | Seltzer |
| 3,551,963 A | 1/1971 | Mosher |
| 3,586,202 A | 6/1971 | Shores |
| 3,701,373 A * | 10/1972 | Wronke ................ F16B 37/043 411/182 |
| 3,856,050 A | 12/1974 | Rooney |
| 4,104,952 A | 8/1978 | Brass |
| 4,352,589 A | 10/1982 | Allison et al. |
| 4,834,601 A | 5/1989 | Schaap |
| 10,124,745 B2 | 11/2018 | Del Pozo Gonzalez et al. |
| 2012/0251226 A1 | 10/2012 | Liu et al. |
| 2014/0133937 A1 | 5/2014 | Tyson et al. |
| 2015/0197970 A1 | 7/2015 | Morris et al. |

FOREIGN PATENT DOCUMENTS

| | | |
|---|---|---|
| FR | 2302442 A1 | 9/1976 |
| GB | 2401661 A | 11/2004 |
| JP | 2007285330 A | 11/2007 |
| JP | 4255231 B2 | 4/2009 |
| JP | 5855099 B2 | 2/2016 |

* cited by examiner

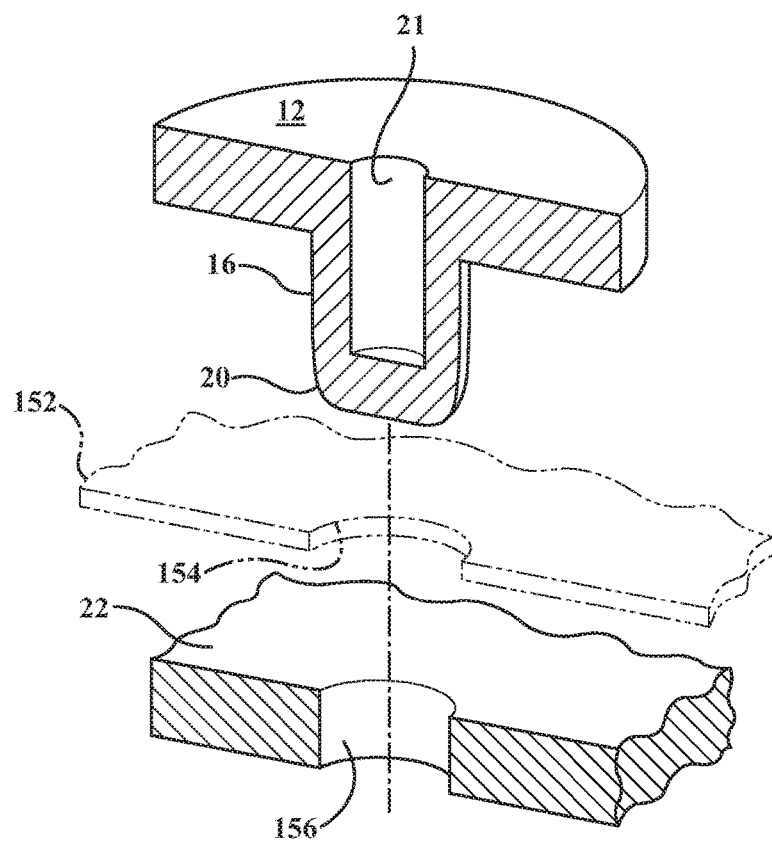
FIG. 18
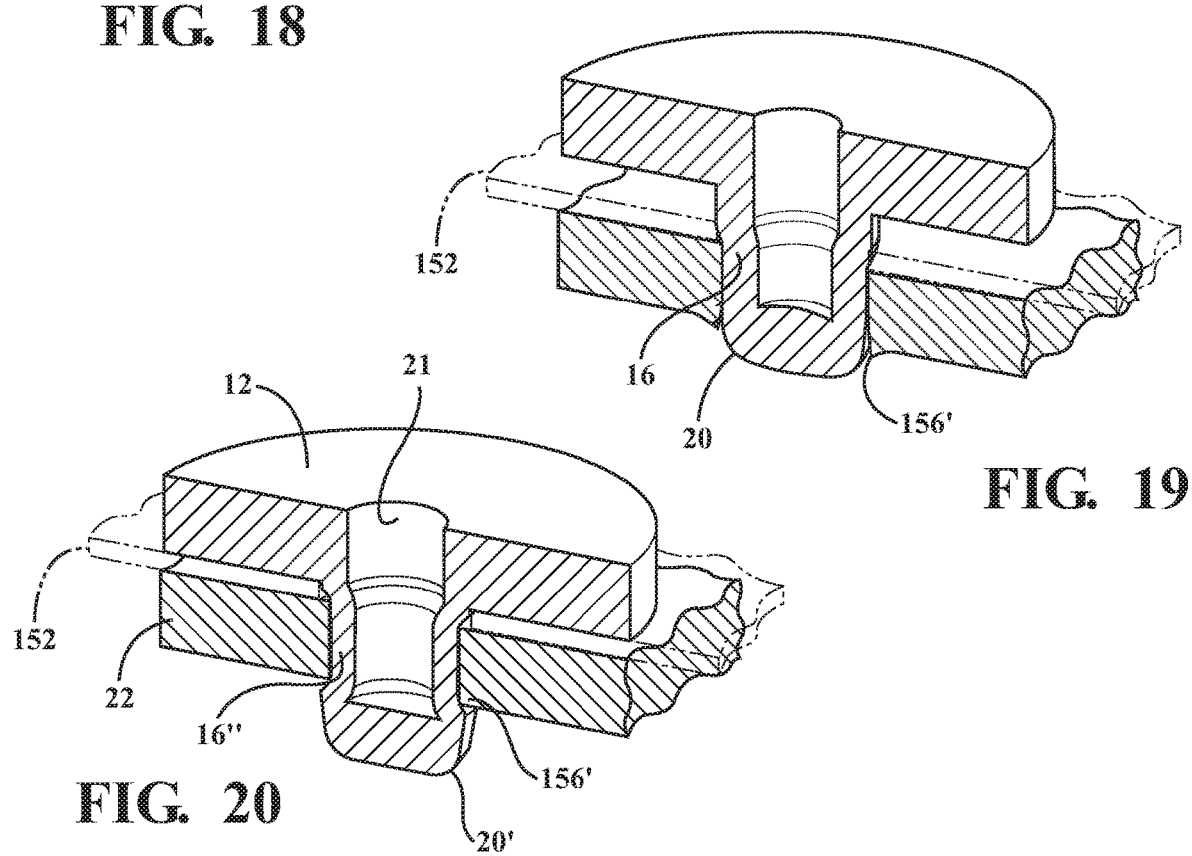
FIG. 19
FIG. 20

METHOD FOR INJECTION MOLDED RIVET STYLE FASTENER AND HOUSING WITH SNAP ASSEMBLY FUNCTIONALITY ALONG WITH AN INJECTION MOLDING PROCESS FOR PRODUCING SUCH A RIVET WITHOUT AN UNDERCUT FEATURE

CROSS REFERENCE TO RELATED APPLICATIONS

The present application is a continuation-in-part application of U.S. Ser. No. 15/409,839 filed Jan. 19, 2017, which claims priority to U.S. Ser. No. 62/322,645 filed Apr. 14, 2016, the contents of which are incorporated herein in their entirety.

BACKGROUND OF THE INVENTION

Field of the Invention

The present invention discloses a no snap-action rivet and associated non-slide actuated molding process avoiding the necessity of forming an undercut profile in the molded rivet stem and allowing the formation of a partially hollowed rivet stem (solid at the outermost end but hollowed from the intermediate interior through the central opening at the flattened top). A receiving location is provided with an opposing and through-seating aperture, the latter typically including an angled or saucer-like or chamfered profile which terminates in a thin/sharpened inner rim edge which defines a diameter of somewhat lesser dimension than that presented by the cross section of the inserting rivet stem.

In this fashion, the solid end-most portion (tip) of the rivet stem is force pressed through the surrounding aperture so that it is in resistive contact with the narrowed rim edge which can include a chamfered or narrowed taper to cause the rim edge to be initially deformed outwardly, with the subsequent aligning of the intermediate walls of the stem, such defined by the hollow interior, to align with the rim edge in a fashion such that the hollow location of the stem is caused to deflect or bow inwardly to thereby create the equivalent of a desirable (and withdrawal resistant) undercut profile.

Background of the Relevant Art

The prior art discloses a variety of combination compression/expansion fasteners assemblies. A first example of this is depicted in FR1255864 (ITW) which teaches a deformable rivet assembly with an arcuate and bulbous end configuration along its stem which deflects from a collapsed (concave) position to protruding (convex) position.

The tubular rivet of Nichiei Bussan Co., Ltd. (FR 2 302 442) exhibits a linearly collapsible outer tubular wall (see FIGS. 4A-4B) which is actuated by a retractable (upwardly displacing) inner stem (also called a male element) 3. The blind rivet of EP 1 217 229 exhibits an inserting body 2 with irregular radial serrations 12, 14, 16 and which, upon being compressed within a mounting hole by a mandrel 6, converts (i.e. linearly compresses and radially expands) from the position of FIG. 2d to that in FIG. 2e. Also noted is the wall fastener of Schaap, U.S. Pat. No. 4,834,601, the splined fastener of Tyson US 2014/0133937, and the non-compressing stems in the fasteners of JP 855099 and JP2007285330.

Other examples drawn from the prior art include the erector set toy construction system of Brass, U.S. Pat. No. 4,104,952 and which discloses rivets 8 formed of bullet-shaped, soft distensible rubber pieces having a bore 12 passing lengthwise therethrough, but being closed at the leading end (or base 16). The rivets are further disclosed as having an outside diameter greater than the diameter of holes 4 when the rivets are in their relaxed, un-distended condition. A stiff wire 38 is employed which, when inserted through the open base of the rivet, distends the rubberized rivet in an elongated direction to allow the same to pass through aligning pairs of the holes 4, such as which are formed in overlapping locations of erector plates 2 and bars 3. Upon the wire being retracted, the rubberized rivet returns to the un-distended position in which it expands within the aligning holes in order to secure the erector bars and plates together.

Morris US 2015/0197970 teaches an elastically averaged assembly for closure applications which includes a first component having at least one receiving feature. Also included is a second component repeatedly mated with the first component, the second component including at least one protrusion, with the receiving feature configured to fittingly receive the at least one protrusion, and wherein the at least one protrusion is configured to be repeatedly removed from the at least one receiving feature. The at least one protrusion is formed of an elastically deformable material configured to elastically deform upon contact with the at least one receiving feature.

Finally, U.S. Pat. No. 3,168,961, to Yates, teaches a closure plug of a plastic material for inserting through openings in sheet members. The plug exhibits a circular domed head with a planar annular peripheral zone on its underside. An axially disposed, tubular shank extends from the underside, the shank having a bulbous, outer form defined by a pair of substantially identical, frusto-pyramidal surfaces arranged in base-to-base coincidence, the head having an annular channel in its underside, which extends form the shank to the annular zone.

SUMMARY OF THE PRESENT INVENTION

The present invention discloses a method for creating and installing a fastener assembly having an engaging portion with a projecting stem which is interiorly hollowed over at least an intermediate extending range. The stem includes a solid end most extending portion in communication with at least an intermediate hollowed out interior cavity. A receiving portion is provided with a surface having an inner rim defined edge, a diameter of an aperture between the rim edge being less than a diameter of an inserting portion of the stem. Upon forcible passage of the solid end of the fastener past the narrowed rim edge, the narrowed rim edge can be caused to initially and initially deform outwardly, with a location of the intermediate hollowed interior portion of the stem subsequently aligning with the narrowed rim edge and being caused to be inwardly collapsed by the rim edge in order to anchor the portions together.

Additional features include the stem having any of a circular or other polygonal exterior cross sectional profile. The inner rim defined edge may further exhibit a chamfered shape terminating in a narrowed rim profile. The inner rim edge defines a flat profile equal in dimension to that of the lower engaging portion.

In an additional variant, the exterior cross sectional profile of the stem and the inner rim define edge can define either matching or varying profiles. The engaging and receiving locations can also exhibit any dimensional shape, and it is also envisioned that these can assemble according to any open or enclosing three dimensional housing.

Several variants related variants of the present design include the configuration of the inner perimeter rim defined edge being flexible and partially deformable in response to the initial press-fit and pass-through of the solid end of the engaging portion. The perimeter edge of the receiving portion can, in one non-limiting variant, exhibit a stiffness similar to that of the stem of the engaging portion, such resulting in both members collapsing/flexing to respective degrees during installation of the engaging portion.

A further embodiment can include the hole defining rim edge of the receiving portion being either softer/more flexible or harder/less flexible than the stem of the rivet, as a result allowing to modify the degrees of relative deformation/collapse of the interiorly hollowed portion of the engaging stem relative to the outer flexing/deformation of the rim edge defined within the receiving portion. Without limitation, the material selections of the engaging and receiving portions can include a variety of thermoplastic or other materials exhibiting varying stiffness properties and which permit the achievement of a desired deformation/engagement profile and retention force for a given application.

An associated forming process is also disclosed for injection molding the engaging portion rivet, such dispensing with the need of providing for movable slide actuation of the undercut forming portions (e.g. providing a no-action mold) and in order to create the fastener of the present invention. Other applications of the article and associated forming process include replacing sonic welds, push pins or traditional latching features. Post and hole configurations of any article produced according to the present inventions can vary from circular as shown, it further being understood that the post and hole can additionally vary from one another in use.

BRIEF DESCRIPTION OF THE DRAWINGS

Reference will now be made to the attached drawings, when read in combination with the following detailed description, wherein like reference numerals refer to like parts throughout the several views, and in which:

FIGS. 5A-5B are cutaway exploded and assembled views, respectively, of the no-action snap fastener of FIG. 4;

FIGS. 18-20 illustrate a series exploded pre-installation, intermediate installation and post installation view of another non-limiting variant of the present design in which the configuration of the inner perimeter rim defined edge can also exhibit a stiffness similar to that of the solid end of the engaging portion, such resulting in both members collapsing/flexing during installation.

DETAILED DESCRIPTION OF THE PREFERRED EMBODIMENTS

As previously described, and with further reference to the attached illustrations, the present invention discloses a variety of no snap-action rivet configurations and associated non-slide actuated molding process, such for avoiding the necessity of forming an undercut profile in the molded rivet stem. As will be further described, each of the variants incorporates a partially hollowed rivet stem (solid at the outermost end but hollowed from at least the intermediate interior and typically through the central opening at the flattened top) which is formed in combination with an opposing and through-seating aperture, the latter typically including any narrowing or angling of the material rim surrounding the aperture such including any of an angled/chamfered or saucer-like profile which terminates in a thin/sharpened inner rim edge and which defines a diameter of somewhat lesser dimension than that presented by the cross section of the inserting rivet stem. For purposes of the present description, the narrowing of the aperture defining rim edge will be referenced hereinafter as being "chamfered" it being understood that this term can be extended to cover a multitude of different narrowing profiles not limited to any straight angle or saucer-like configuration.

In this fashion, and upon press-fitting the solid end-most portion (tip) of the rivet stem through the aperture and in resistive contact with the narrowed rim edge, the intermediate extending walls of the stem defined by the hollow interior are caused to deflect or bow inwardly to thereby create the equivalent of the desirable (and withdrawal resistant) undercut. As will also be described, an associated forming process is also disclosed for injection molding the rivet and dispenses with the need of providing for movable slide actuation of the undercut forming portions (e.g. providing a no-action mold). Other applications of the article and associated forming process include replacing sonic welds, push pins or traditional latching features. Post and hole configurations of any article produced according to the present inventions can vary from circular as shown, it further being understood that the post and hole can additionally vary from one another in use.

Figure 1:
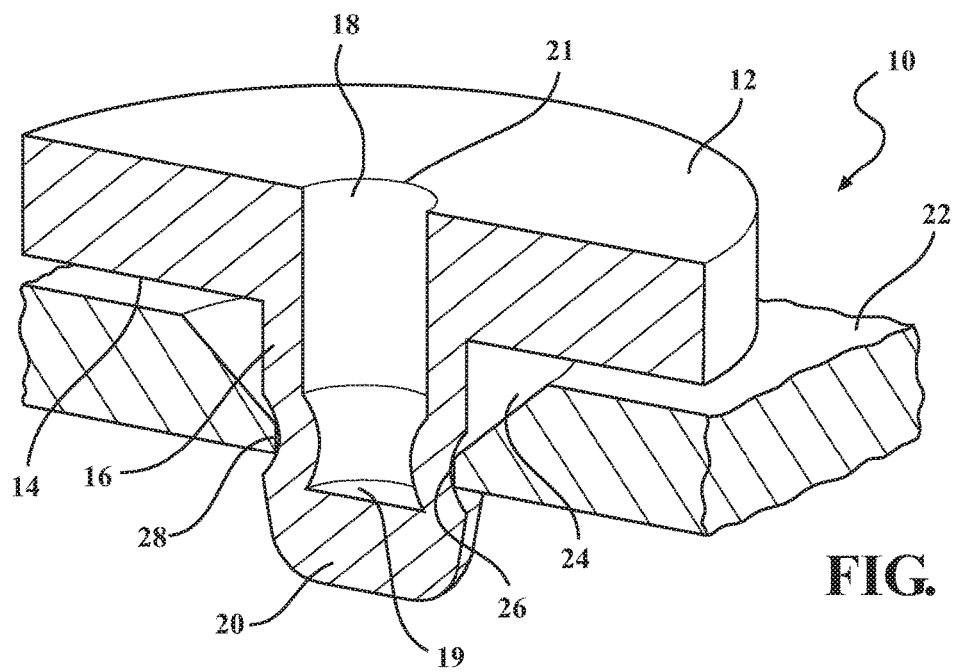
FIG. 1 and related
Figure 5A:
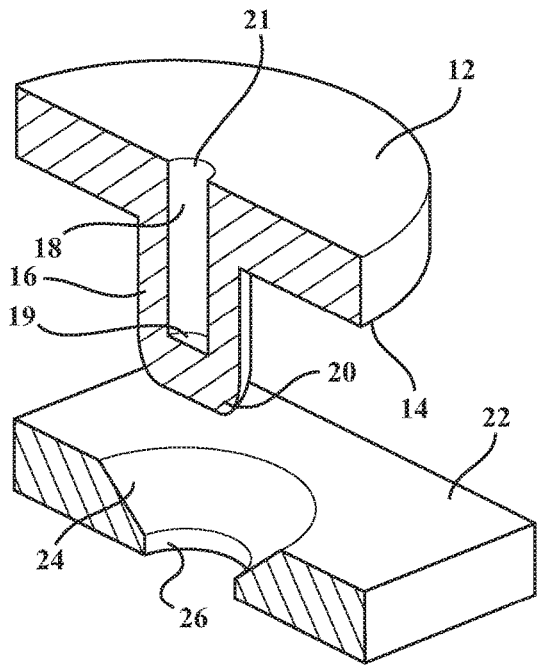
Figure 5B:
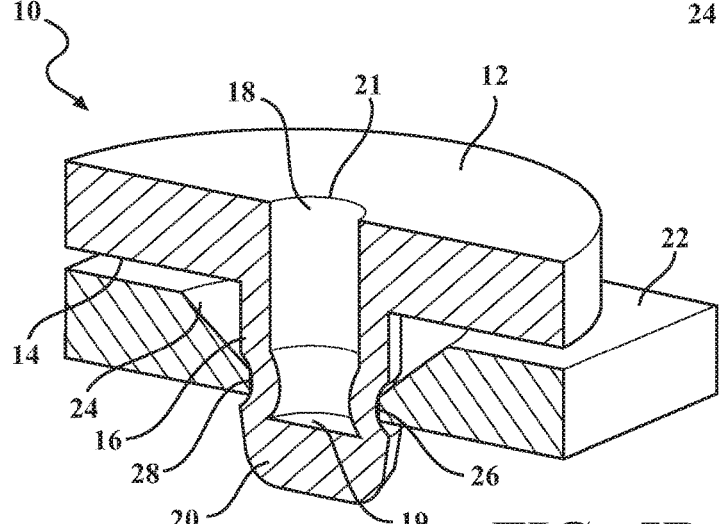
FIG. 5B is an illustration in cutaway of a selected no-action snap rivet feature according to one non-limiting embodiment of the present inventions.

Referring first to FIG. 1 and related FIG. 5B, an illustration is generally provided at 10 in cutaway of a selected no-action snap rivet feature forming a fastener engaging portion according to one non-limiting embodiment of the present inventions. For purposes of the present description, the fastener portions can include any type of injection molded plastic, such typically including a combination of rigidity and structural collapsibility which is associated with the integral construction of the upper and lower mounting portions of the supporting structure or housing components with which the fastener portions are formed.

As previously indicated, the engaging fastener portion (also termed hereinafter to include an upper mounting portion) has an upper surface 12 which is understood to include any of an individual enlarged fastener head, or which can be integrated in singular or plural fashion within a first mounting surface (see also underside of upper engaging component in FIG. 7). A partially hollowed rivet stem extends from an underside surface 14 of the fastener head or first mounting layer, such defining a thickness between the upper 12 and lower 14 surfaces.

Figure 4:
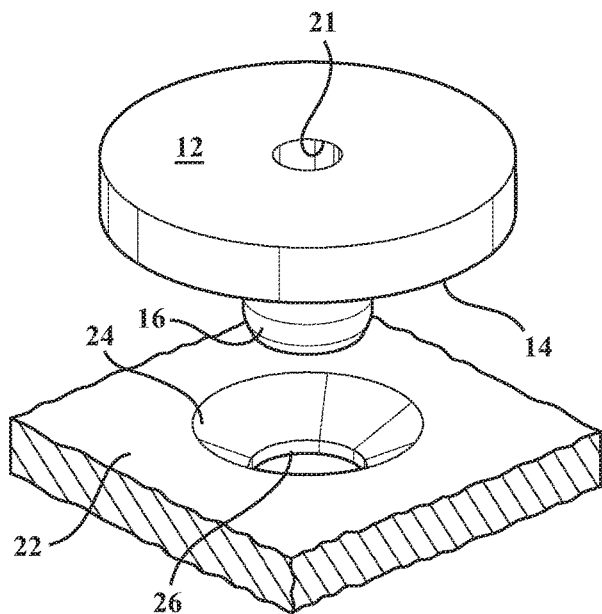
FIG. 4 is an exploded view of no-action snap fastener according to a further embodiment.

As further depicted in related FIGS. 4 and 5A-5B, the stem (at 16) is hollowed, further at 18, between at least an intermediate interior end wall 19 communicating with a solid outermost end 20 to an open rim edge 21 communicating with the upper surface 12 of the rivet/fastener head. The present invention contemplates the hollowed or cavity interior of the stem extending either partially or completely from the lower/interior end wall 19 to the upper rim edge 21. In combination, an opposing and through-seating aperture is provided in a base mounting surface 22, such depicted as a rectangular or square shaped receiving portion, however again being understood to include any secondary mounting surface for receiving the inserted stem 16 and which can also be any larger sized surface (referencing again FIG. 7) incorporating a plurality of mounting locations which match a number and arrangement of stems 16 and for resistively anchoring the surfaces together in the manner described herein.

The receiver mounting surface 22 (hereinafter referred to as a lower receiving portion) further exhibits, in one non-limiting embodiment, an angled or saucered/chamfered profile, at 24, which terminates in a thinner/sharpened inner rim edge 26. As shown, the rim edge defining the inner aperture defines a diameter of somewhat lesser dimension than that presented by a cross section of an exterior annular surface associated with the inserting rivet stem. As will be further described, the shape, dimension and profile of the inner rim edge can be modified in order to adapt to different engaging fasteners, such as in order to adjust the holding forces established therebetween and which can be further accomplished through modifying the material selection of the engaging and receiving portions so that they can either exhibit similar properties or in which one can be more or less flexible/stiff than the other (further reference being made to succeeding variants in FIGS. 15-17, 18-20 and 20-23).

The variances in this force-fitting inter-dimensional relationship are based on a number of considerations, not limited to the material construction of the inter-engaging rivet fastener portion 12 and aperture receiving location 22, the thickness of the outer perimeter wall associated with the stem 16, as well as the thinned rim edge configuration 26 formed in the receiving layer 22. In this fashion, and upon press-fitting the solid end-most portion 20 (tip) of the rivet stem 16 through the aperture in resistive contact with the narrowed rim edge 26, and then beyond the thinned edge 26, the subsequent alignment of intermediate extending walls of the stem defined by the hollow interior aligning with the thinned edge 26 cause the annular stem wall to deflect or bow inwardly (see concave or collapsing profile at 28) to thereby create the equivalent of the desirable (and withdrawal resistant) undercut in the rivet stem.

Figure 2A:
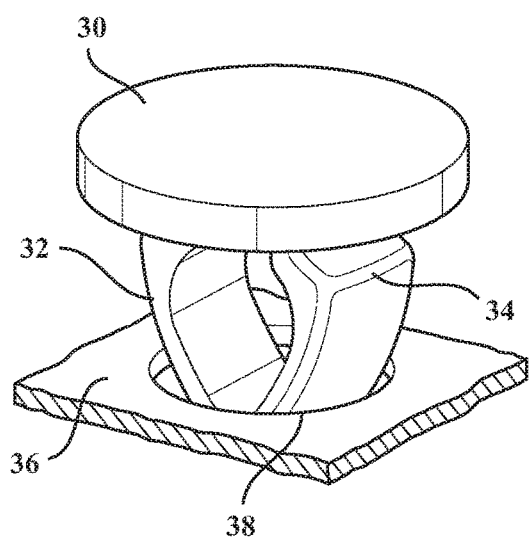
FIGS. 2A-2C present a series of views of an undercut snap action fastener according to the Prior Art.
Figure 2B:
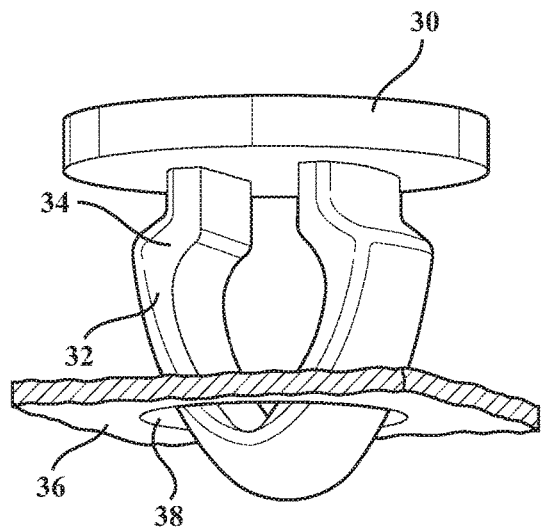
Figure 2C:
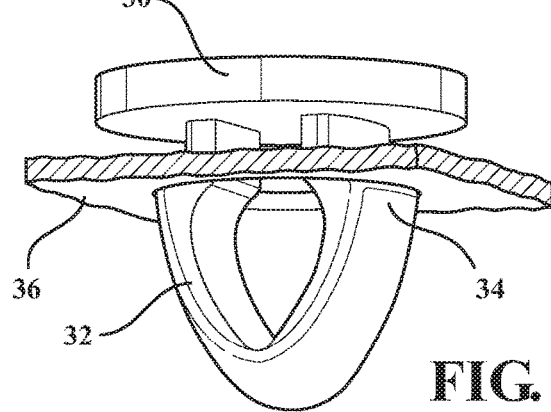

Referring to FIGS. 2A-2C, presented are a series of views of an undercut snap action fastener according to the Prior Art and which provide a contrast to the (no-action) snap fasteners of the present invention. Specifically, the typical molded fastener exhibits a first mounting (upper) layer 30 with which is formed an engagement body 32 (shown having a generally elliptical or non-liner shape) and which also includes a further undercut region, see at 34, typically proximate to an underside of the layer 30. A second mounting layer, at 36, likewise includes an aperture defined by an inner rim edge 38 (typically non-chamfered) and, upon downwardly engaging the first/upper layer 30 through the aperture in the second/lower layer 36 of the fastener, the body 32 is caused to resistively fit through the rim edge 38 until fully seating at the uppermost/inner undercut profile or region 34.

Figure 3A:
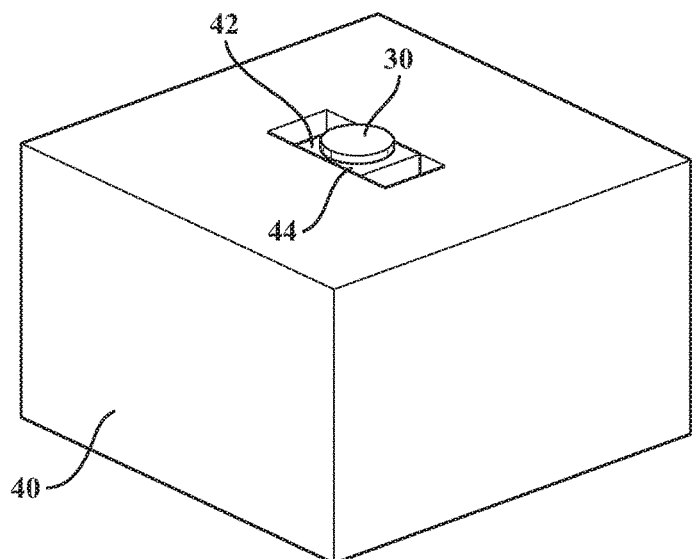
FIGS. 3A-3C present a series of process views of a mold assembly with movable slides for producing the snap action fastener according to the Prior Art.
Figure 3B:
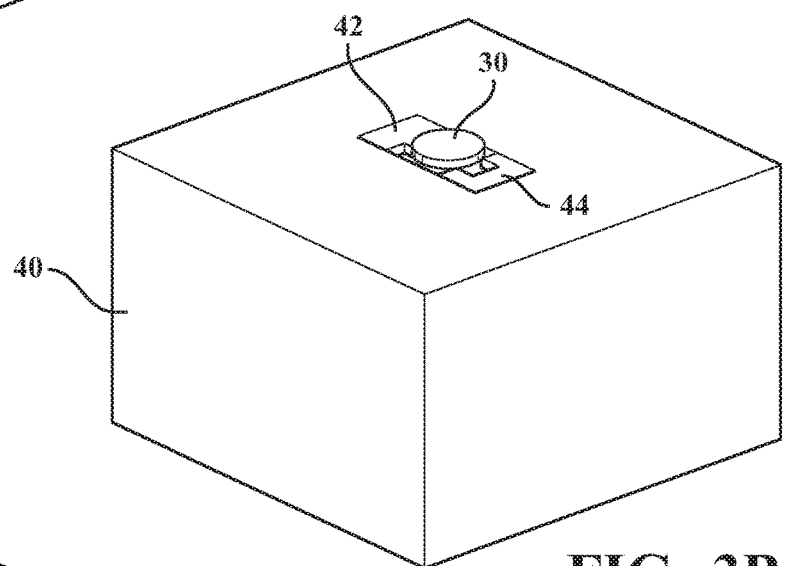
Figure 3C:
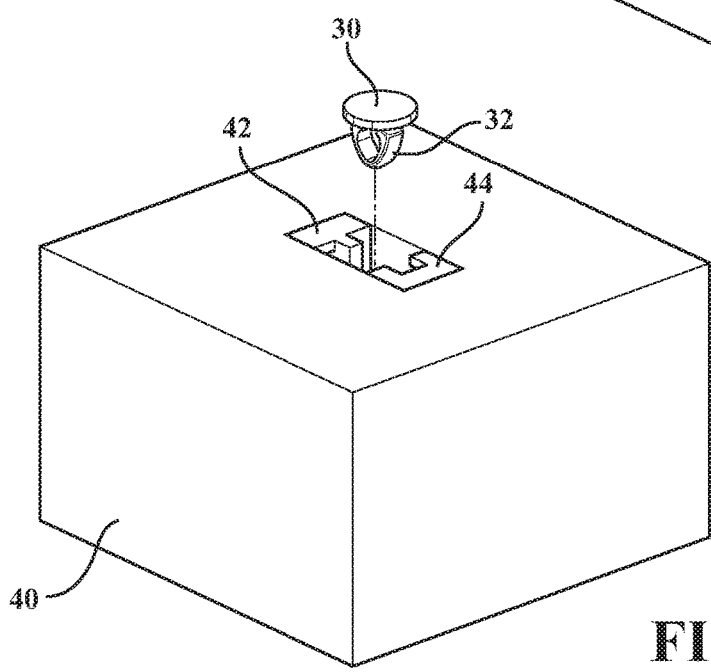

FIGS. 3A-3C present a series of process views of a simplified depiction of a mold assembly, at 40, with inter-movable slides 42/44 for producing the snap action fastener 30 according to the Prior Art. For purposes of ease of illustration, only a single half of the injection molding tool is depicted, with other necessary and known components for producing the molded part not being illustrated.

FIG. 3A depicts a first stage in which the fastener part 30 is initially formed (with the slides inwardly positioned relative one another). FIG. 3B subsequently shows the slides 42/44 movably retracted away from one another, such motion being generally referenced as "action" of the tooling and which is required in order to both form the undercut region 30 as well as to permit subsequent removal of the part from the tool (FIG. 3C). As therefore illustrated, the formation of the undercut in the fastener upper part adds complexity to the injection mold tool and requires the inclusion of the inter-displaceable die slides 42/44 in order to facilitate part removal at the end of the injection molding process.

As previously described, FIG. 4 is an exploded view of the no-action snap fastener, such as according to the previously described embodiment 12 and in which (unlike the prior art views of FIGS. 2-3) the underside extending stem 16 of the upper fastener portion exhibits no undercut features which would require action on the tooling (e.g. the incorporation of die slides or the like). FIG. 5A depicts a combination exploded and cutaway of the engaging rivet 12 and receiving surface 22 with a dovetailed and narrowed/thinned profile for receiving the stem in the manner described with respect to FIG. 1. As again shown in FIG. 5B, the thinned sidewalls of the stem exhibited by the hollowed interior 18 of the feature result in inward collapse (again at 28) once the solid tip 20 of the stem is forced through the smaller dimensioned opening established by the rim edge 26.

Figure 6A:
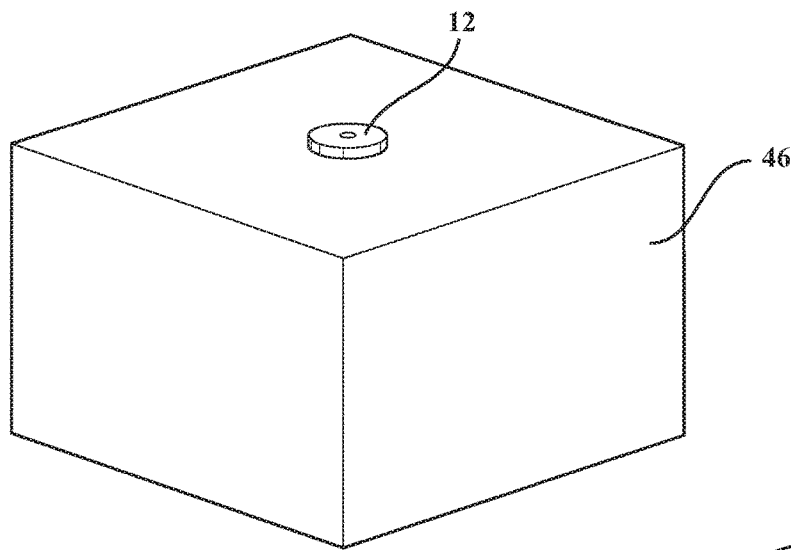
FIGS. 6A-6B correspond to FIGS. 3A-3C and illustrate a process view of a mold assembly not requiring movable slides for producing the fastener of FIG. 4.
Figure 6B:
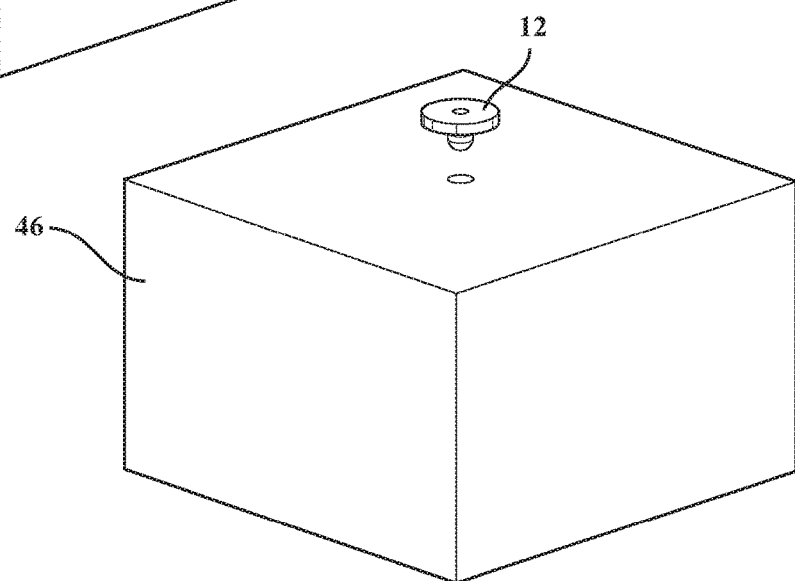

FIGS. 6A-6B correspond to FIGS. 3A-3C and illustrate a process view of a mold assembly, a first or lower half of which is representatively shown at 46 for producing the upper fastener 12 and again not requiring movable slides for producing the fastener of FIG. 4. In this manner, the molded part 12 can be directly removed from the tooling without the requirement of any die slide or other action for accommodating any integrally formed undercuts.

Figure 7:
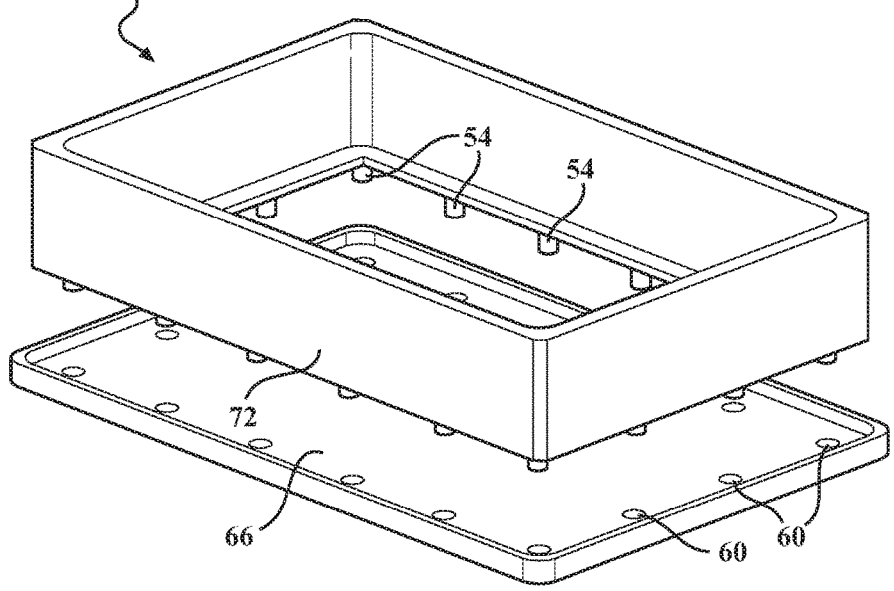
FIGS. 7, 8 and 9A-9B illustrate a collection of alternate applications of the no-action snap fastener and which can be utilized to replace such as sonic welds, push pins or traditional latching features.
Figure 8:
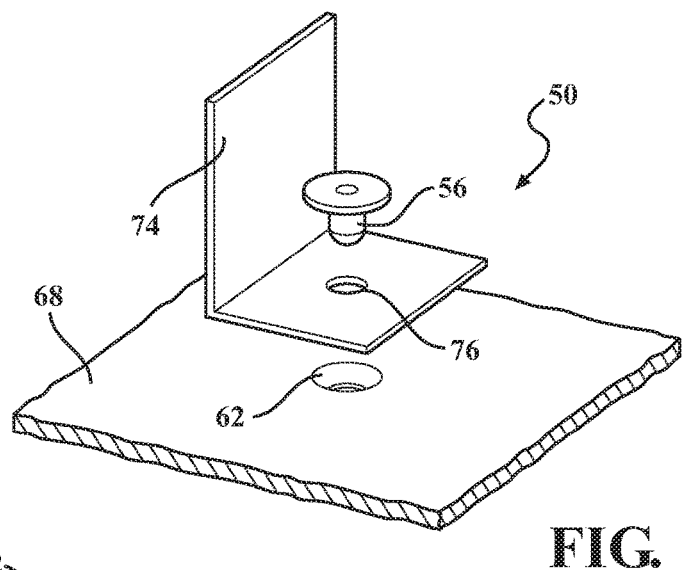
Figure 9A:
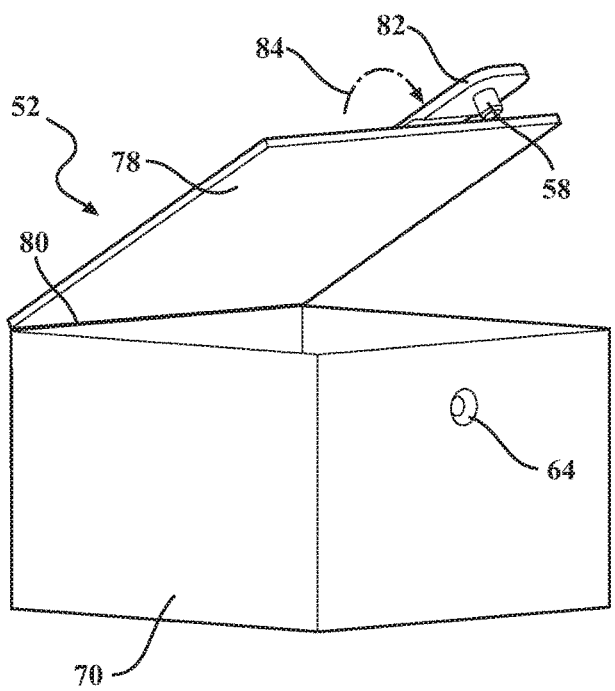

Proceeding to FIGS. 7, 8 and 9A-9B a series of exploded views are illustrated generally at 48, 50 and 52, respectively, of a collection of alternate applications of the no-action snap fastener and which can be utilized to replace such as sonic welds, push pins or traditional latching features. The construction of the extending stem portions, respectively show at 54, 56 and 58 in each of FIGS. 7, 8 and 9A, are similar to as shown in FIGS. 1, 4 & 5A-5B and so that they each provide for a controlled inward collapse, as specifically illustrated in FIG. 5B, once forced through inner rim edge profiles (at 60, 62, and 64 respectively) defined in variously configured lower mounting surfaces 66 (generally flattened lower layer with rim edge as in FIG. 7), 68 (generally planar shaped lower layer as in FIG. 8) and 70 (generally three dimensional structural article or box shape as in FIG. 9A). The configuration of the inner rim edge configured apertures in each of these figures is similar to that previously described in reference to the receiving surface 22 of FIG. 1 with narrowed rim edge profile (again depicted as dovetail or saucer-like surface 24 terminating in inner thinned/narrowed edge 26)

As previously described, the no-action snap fastener design focuses on the inter-fitting and controlled collapsing arrangement established between the hollow interior intermediate portion of the stem and the inner rim edge profile of the associated mounting aperture. The embodiments 48, 50 and 52 depicted can, as previously disclosed, exhibit any type of shape or configuration.

In the case of the variant 48 (FIG. 7), a two piece assembleable tray includes a rectangular and interiorly open upper body 72, from a bottom perimeter rim surface of which project the various mounting stems 54. In the instance of the variant 50 (FIG. 8), an "L" bracket 74 having a lower side with an aperture 76 formed therethrough is provided and such that the stem 56 of the associated upper fastener is inserted through the aperture 76 and aligning underneath positioned aperture 62, and in order to mount the bracket 74 to the plate shaped member 68.

Figure 9B:
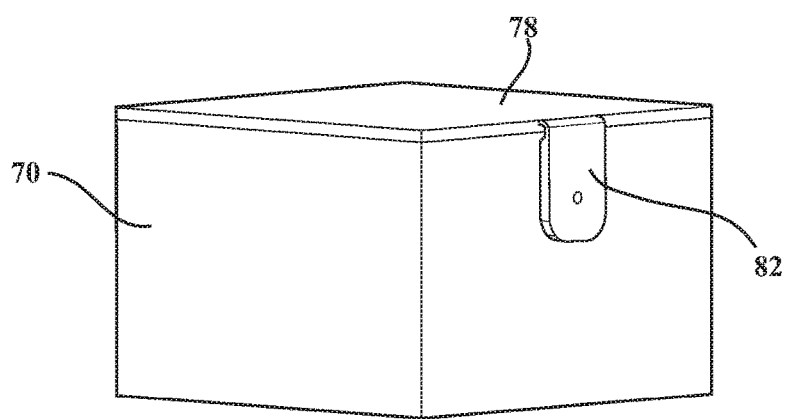

In the still further example of the variant 52, a lid 78 is pivotally mounted to an upper edge of the lower three dimensional box shape 70, such as along edge 80 which can constitute a hinge. Upon pivoting the lid 78 over the top rim edge of the box 70, a forward projecting portion 82 of the lid, this including a downwardly pivoting hinge edge (arrow 84) facilitates the underside projecting stem 58 to collapse-ably engage through the aperture 64 in order to seal the enclosure as depicted in FIG. 9B. The varying examples shown are intended to provide non-limiting examples of the limitless range of potential applications for the collapsible fastener design in use with any engagement stem (whether or not associated with a separate fastener or rivet) and receiving location, again including the dovetail and inner/narrowed edge profile for defining a dimensioned aperture for receiving the stem in a friction inserting fashion as described above.

Figure 10:
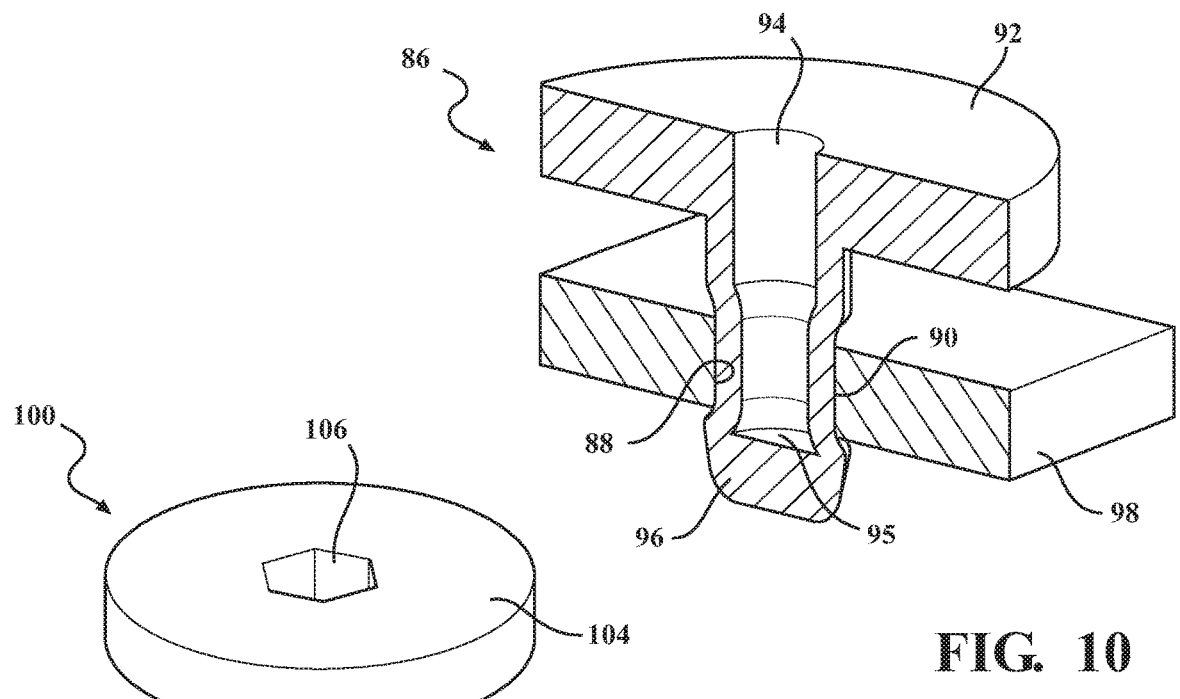
FIG. 10 is an assembled cutaway in perspective of a variant of the no-action snap fastener utilizing a non-chamfered configuration in the mounting surface hole in combination with a more elongated and interiorly hollowed stem than in the variant of FIG. 1.

FIG. 10 is an assembled cutaway in perspective, generally at 86, of a variant of the no-action snap fastener utilizing a non-chamfered configuration (see annular or flat rim edge 88) in the mounting surface hole in combination with a more elongated and interiorly hollowed stem 90, this in comparison to that shown in the variant of FIG. 1. Similar to the previously described variant, the upper fastener 92 exhibits a hollow interior (see inner rim wall 94) which communicates through the stem 90, the interior terminating at an end wall 95 from which extends a solid end-most portion 96 of the stem.

In this fashion, the passage of the solid portion 96 through the bottom (in this instance non-chamfered portion) surface and adjoining edge of lower fastener portion 98 is such that the rim edge is flat and, following through-inserting of the solid end-most portion 96, results in controlled collapse (see at 90) of the hollowed interior portion of the stem. As further shown, the elongated aspect of the stem 90 (as compared to that at 16 in FIG. 1) facilitates use with a non-chamfered or narrowed rim edge 88 (as compared to at 26) for providing adequate inter-engagement.

Figure 11A:
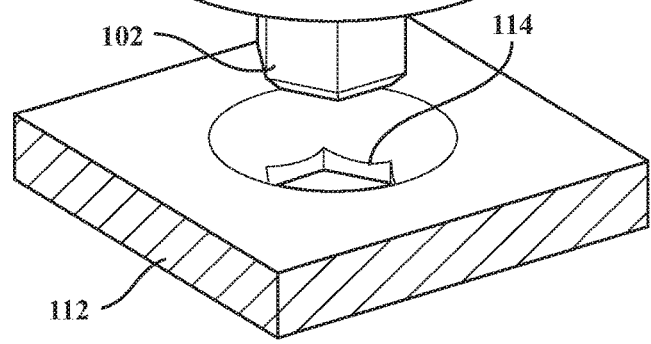
FIGS. 11A-11B illustrate another embodiment related to that of FIG. 1 and illustrating a polygonal (non-circular cross sectional shaped) configuration associated with the underside projecting stem of the fastener as well as a mating inner narrowed perimeter edge configuration associated with the chamfer configured aperture in the base mounting layer.
Figure 11B:
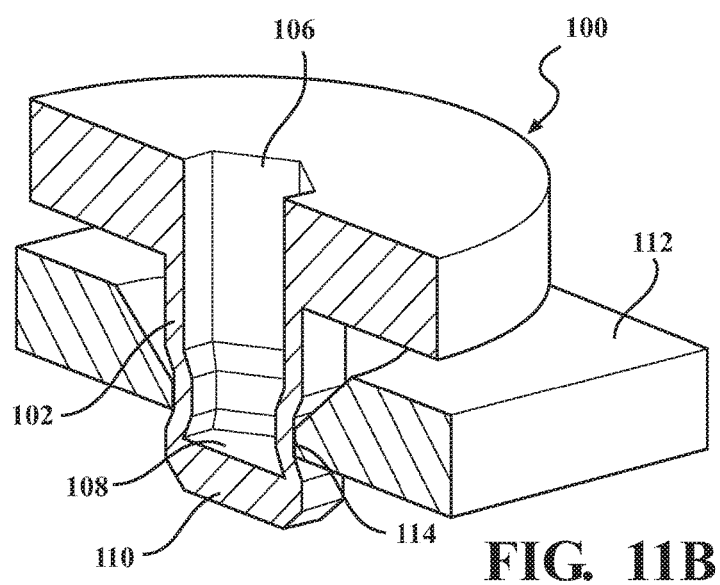

FIGS. 11A-11B illustrate another embodiment, generally at 100, related to that of FIG. 1 and illustrating a polygonal (non-circular cross sectional shaped) configuration associated with the underside projecting stem, at 102, of an upper fastener 104, such further including a hex profile aperture (see as further depicted by upper edge 106) extending to an end surface 108 terminating in a solid end 110 of the stem 102. As further shown, the lower fastener mounting surface, at 112, exhibits a mating inner narrowed perimeter edge configuration, in the form of a narrowed hex shaped rim defined aperture 114, associated with the dovetail configuration in the base mounting layer 112, this providing one non-limiting example of a non-round cross sectional shaped stem which engages with a likewise cross sectional shaped rim defined aperture according to the aspects of the present invention.

Figure 12:
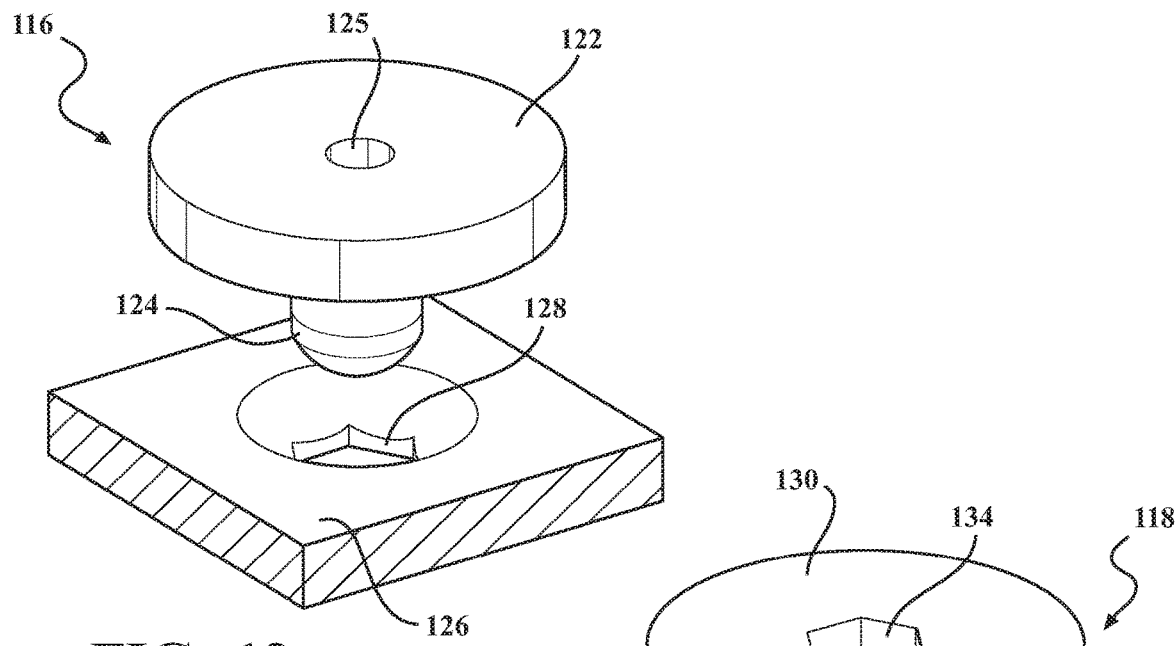
FIGS. 12-14 are a further collection of exploded views of alternate no-action snap fasteners exhibiting varying shape and profile combinations.
Figure 13:
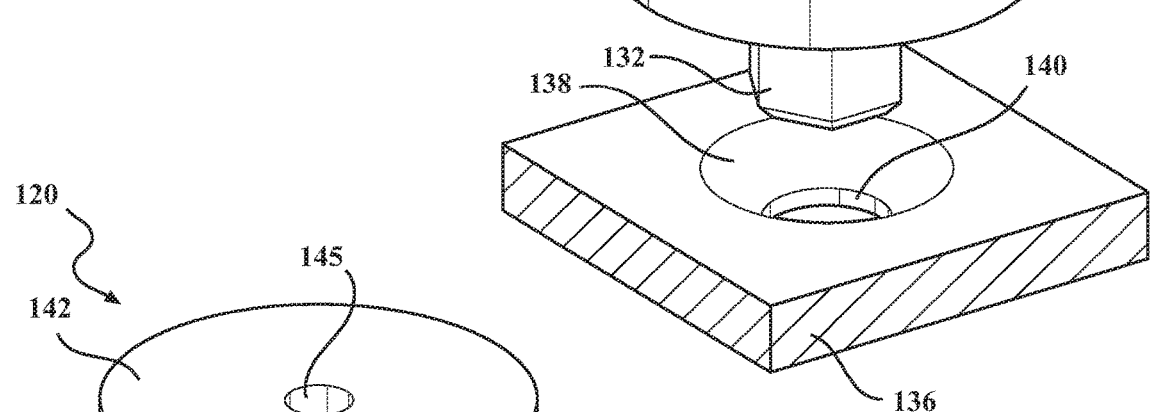
Figure 14:
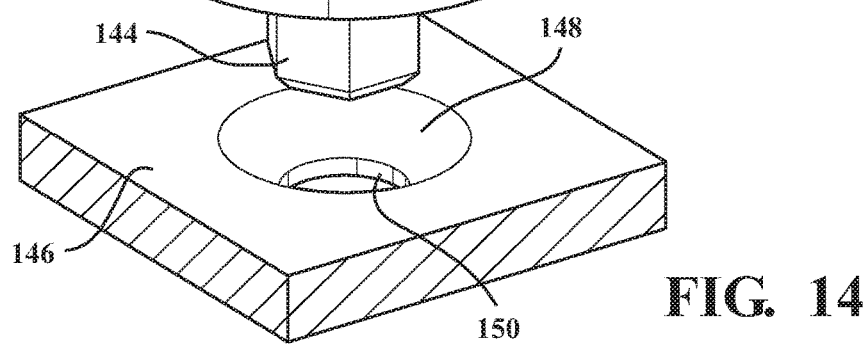

FIGS. 12-14 illustrates a further collection of exploded views of alternate no-action snap fasteners, see respectively at 116, 118 and 120, exhibiting varying shape and profile combinations. In the case of FIG. 12, this includes upper fastener 122 with downwardly projecting stem 124 (with central extending and interiorly hollowed aperture 125) engaging a lower receiving location 126 having a non-matching cross sectional rim edge aperture profile 128. In the instance of FIG. 13, upper fastener 130 includes a lower projecting stem 132 which is internally communicated by an inner hex aperture profile 134, such that an outer hex profile of the stem 132 can engage through a non-matching mounting aperture in the lower receiving location 136 (this further shown by circular dovetail profile 138 with narrowed circular rim edge 140).

FIG. 14 further depicts upper fastener 142 having lower extending stem 144, an interiorly extending aperture 145 defined within the outer hex profile of the stem 144. The lower fastener, at 146, replicates that shown at 136 in FIG. 13 with a dovetail inner profile 148 in the lower receiving layer (or receiving fastener) 146 terminating in a circular narrowed rim edge 150. The example of FIG. 14 exhibits the ability of non-matching cross sectional profiles between the upper fastener stem and the lower fastener aperture rim, such still permitting secure engagement. In this fashion, any mating or non-mating configuration between upper fastener stem and lower fastener rim aperture can be accommodated, so long as the hollowed intermediate extending interior of the stem facilitates pre-passage of the solid end-most portion of a larger dimensioned stem (relative to the inner rim edge defined diameter of the receiving location), following which translation of the hollowed intermediate portion of the stem is caused to inwardly collapse in order to permanently affix the fasteners together.

Figure 15:
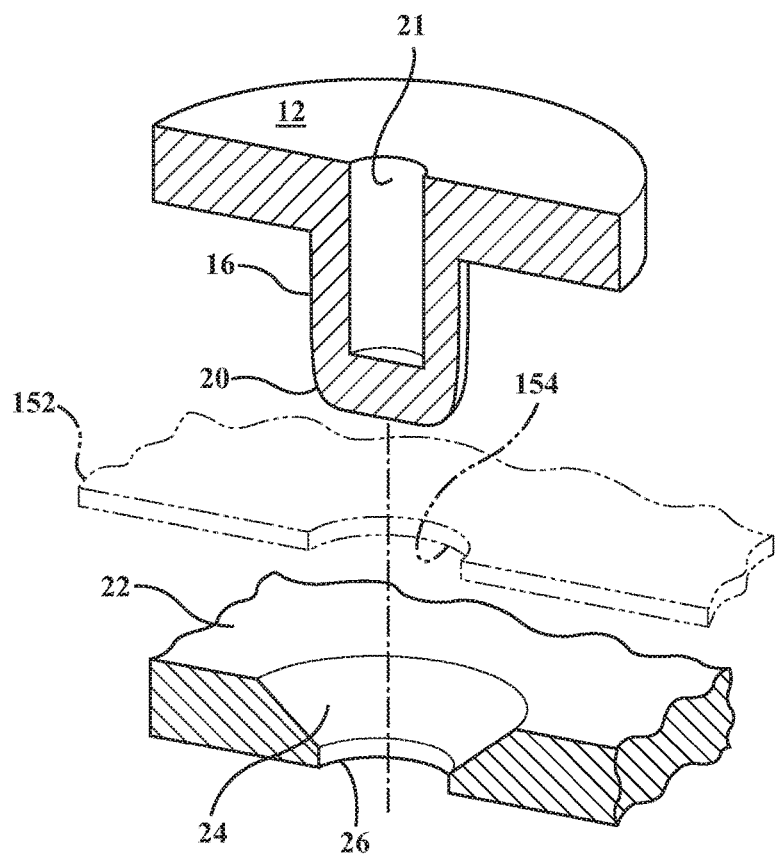
FIGS. 15-17 illustrate a series exploded pre-installation, intermediate installation and post installation view of one non-limiting variant of the present design in which the configuration of the inner perimeter rim defined edge is more flexible than the engaging portion and is caused to partially deformable in response to the initial press-fit and pass-through of the solid end of the engaging portion.
Figure 16:
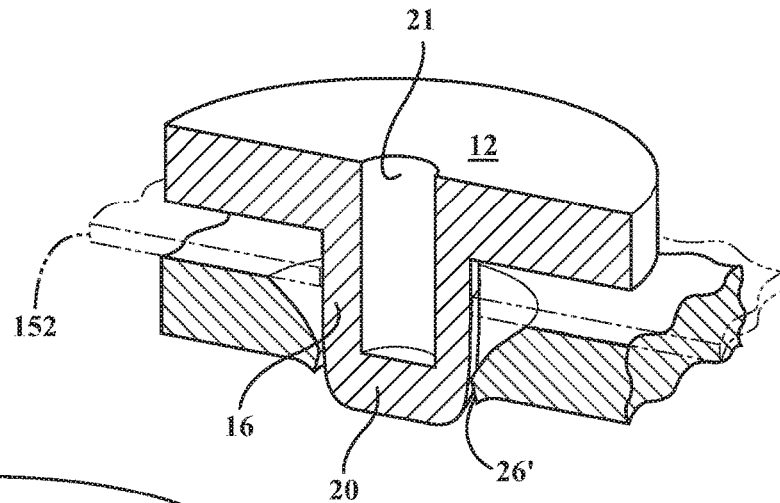
Figure 17:
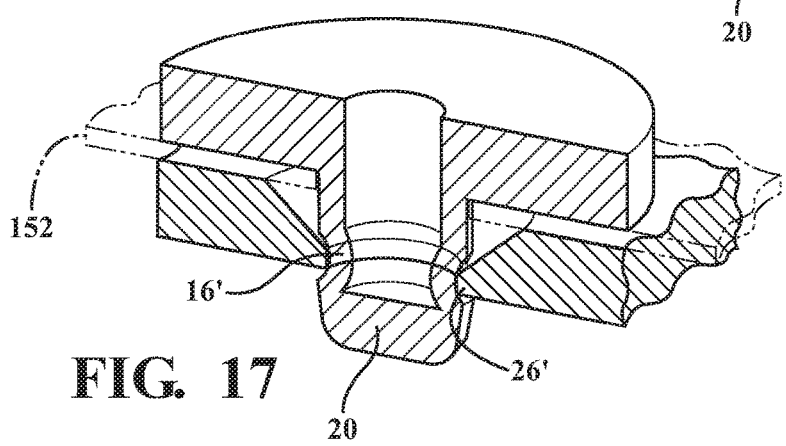

Referring now FIGS. 15-17 illustrate a series exploded pre-installation, intermediate installation and post installation view of one non-limiting variant of the present design similar to that previously shown in FIGS. 5A-5B, and in which the configuration of the inner perimeter rim defined edge (see as again defined by tapered or chamfered profile 24 terminating in a narrow rim edge 26) can be provided more flexible than the engaging portion (also rivet fastener portion with enlarged upper end or head 12 at an end opposite that of the solid end 20). In this manner, and referencing the intermediate installation position of FIG. 16, the narrowed rim edge is caused to initially deform, at 26', during passage therethrough of the solid end portion 20 of the engaging portion stem 16.

As further shown in FIG. 17, an intermediate location of the stem, see at 16', corresponding to its hollowed interior is arranged in alignment with the narrowed rim edge 26' is caused to partially deform following initial press-fit and pass-through of the solid end 20 of the engaging portion. A third sheet or layer, see as represented in phantom at 152, defines a sandwiched portion which can also be provided and which further optionally includes an inner rim defining aperture 154. Upon placing the sheet or layer 152 with the rim defining aperture in alignment with the narrowed rim edge 26 of the receiving portion, the engaging fastener can be installed in order to bind or sandwich the additional sheet or layer between the engaging portion layer (also enlarged rivet head 12) and the receiving portion or layer 22. Alternatively, the intermediate sandwiched sheet or layer can also include any of a softer or thinner material which may be further provided without an aperture in instances in which the press fit force of the engaging portion is sufficient for piercing the sheet or layer 152 prior to embedding through the inner rim edge 26 of the receiving portion 22.

Referencing now FIGS. 18-20, illustrated are a series exploded pre-installation, intermediate installation and post installation view of another non-limiting variant of the present design in which the configuration of the inner perimeter rim defined edge of the receiving portion 22 is redesigned at 156 to define a relatively planar hole the material thickness of the receiving portion and further so that it does not include either of a chamfer/tapered profile 24 or narrowed inner rim edge 26 of FIGS. 15-17. The receiving portion 22 can otherwise also exhibit a material stiffness similar to that of the engagement portion 12, as initially represented by the solid end 20 of stem 16 and which, upon installation, resulting in both the engagement 12 and receiving 22 members collapsing/flexing to varying degrees.

As further shown in the intermediate installation position of FIG. 19, the straight rim edge of the receiving portion is partially deformed (see at 156') in respond to press fit pass through installation of the solid end 20 of the engaging portion. Relative to the deformation of the narrowed rim edge (again at 26') in FIGS. 16-17, the straight rim edge will be understood to deform to a lesser relative degree however assuming similar material construction of both the engaging and receiving portion. As further shown in FIG. 20, the completed installation can include some degree of deformation (defined as any combination of flex or collapsing) of both the intermediate stem location (at 16") of the engaging portion as well as potentially the solid end portion (at 20') in combination with the determined degree of collapse or flex of the straight aperture edge 20' of the receiving portion. A third sheet or layer, see again as represented in phantom at 152, defines a sandwiched portion which can again be optionally provided and which further can include an inner rim defining aperture 154.

Figure 21:
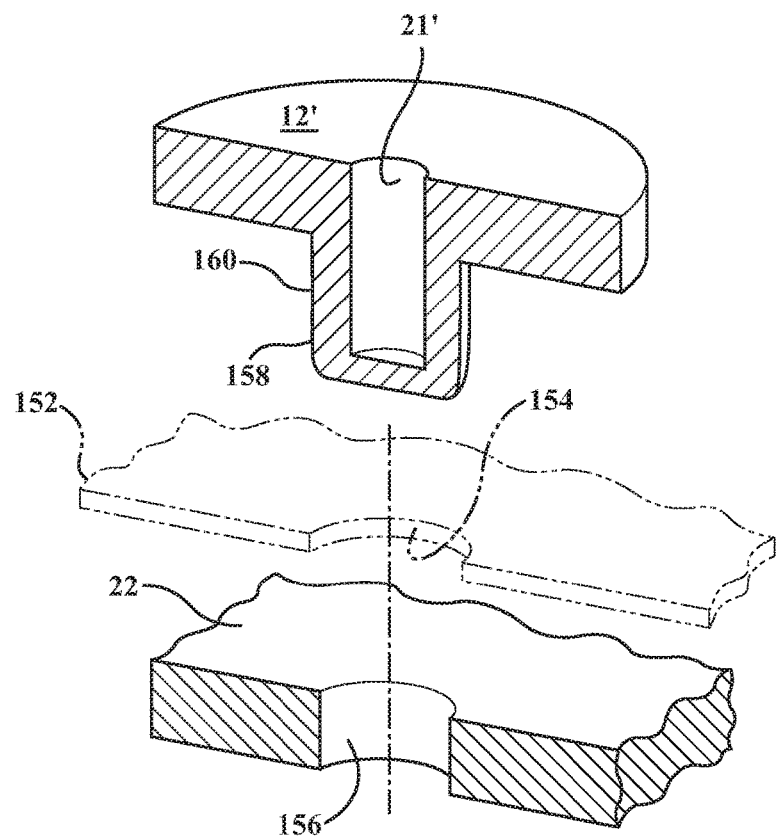
FIGS. 21-23 illustrate a series of exploded pre-installation, intermediate installation and post installation view of a further non-limiting variant of the present design in which the configuration of the inner perimeter rim defined edge is significantly stiffer than the solid end of the rivet, such that the majority of collapsing/flexing is done by the rivet during the installation process.
Figure 22:
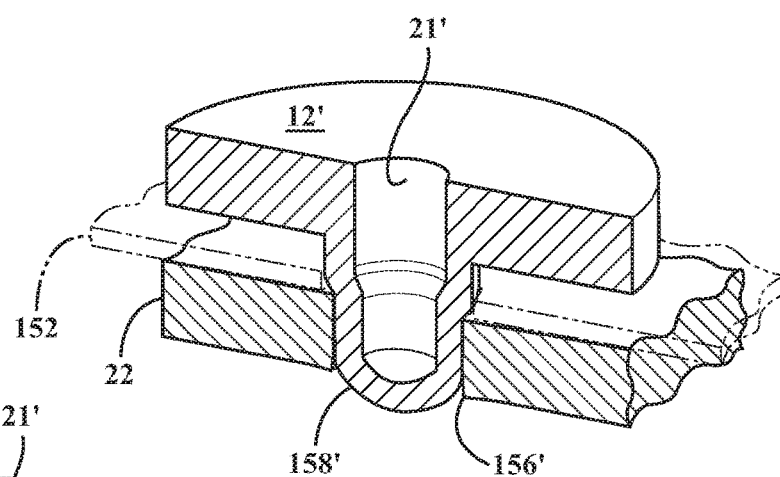
Figure 23:
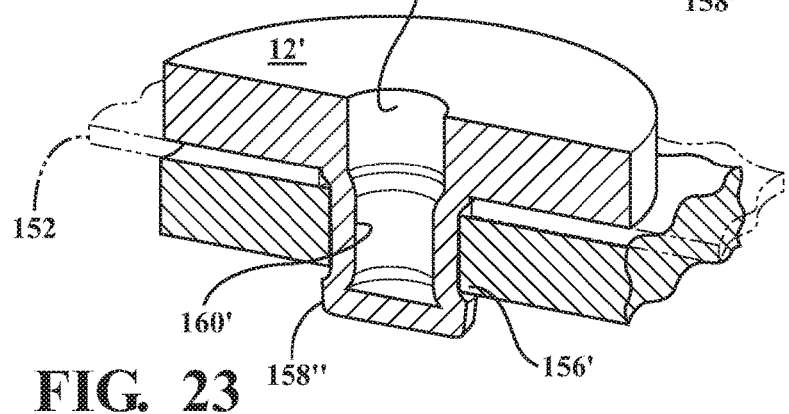

Finally, FIGS. 21-23 illustrate a series of exploded pre-installation, intermediate installation and post installation view of a further non-limiting variant of the present design in which the configuration of the inner perimeter rim defined edge (again depicted as a straight edge 156) is significantly stiffer than a redesigned solid end 158 of a rivet/engaging portion stem, further at 160, such that the majority of collapsing/flexing is done by the rivet during the installation process. This is further depicted by an initial collapsing of the rivet solid end portion, at 158', during the intermediate installation position shown in FIG. 22, and relative to a modest degree of deformation (again at 156') associated with the straight aperture defining rim of the receiving portion 22.

FIG. 23 further depicts the completed installation position in which the aligned location of the hollowed stem interior (at 160') is inwardly collapsed by the partially deformed and encircling outer rim edge 156', concurrent with the solid end of the engaging portion being further deformed, at 158", to establish a desired holding or retaining force with the receiving portion 22. As with the prior embodiments, an intermediate sandwiching sheet or layer, again at 152, can be provided if desired and which can include any type of material.

Having described my invention, other and additional preferred embodiments will become apparent to those skilled in the art to which it pertains, and without deviating from the scope of the appended claims.

I claim:

1. A method for forming and installing a fastener, comprising the steps of:
    forming an engaging portion having a projecting stem which is interiorly hollowed over at least an intermediate extending range, the stem including a solid end most extending portion;
    forming a receiving portion having a surface, within which is configured an inner rim defined edge, a diameter of an aperture between the rim edge being less than a diameter of the stem;
    pressing the solid end most extending portion of the engaging portion through the inner rim edge of the receiving portion;
    deforming the inner rim edge in response to pressing therethrough the solid end most extending portion; and
    aligning with the inner rim edge a location of the interiorly hollowed portion of the stem, causing inward collapsing of the aligned location by the rim edge to secure the engaging portion to the receiving portion.

2. The method of claim 1, further comprising the step of forming the inner rim defined edge to include a chamfered shape terminating in a narrowed rim profile.

3. The method of claim 1, further comprising the step of forming the stem to exhibit a circular exterior cross sectional profile.

4. The method of claim 1, further comprising the step of forming the stem to exhibit a polygonal exterior cross sectional profile.

5. The method of claim 1, further comprising the step of forming an exterior cross sectional profile of the stem and of the inner rim defined edge to define matching profiles.

6. The method of claim 1, further comprising the step of forming the receiving portion as any of a planar or three dimensional shaped article.

7. The method of claim 1, further comprising the step of constructing the receiving portion of a material having less flexibility than the engaging portion and so that the engaging portion experiences a majority of deformation in response to insertion of the engaging portion.

8. The method of claim 1, the step of forming the engaging portion further comprising injection molding the stem with an enlarged head opposite the solid end most extending portion.

9. The method of claim 8, said step of forming the stem interiorly hollowed over at least an intermediate extending range further comprising injection molding a recess channel from the enlarged head within the stem up to the solid end most extending portion.

10. The method of claim 1, further comprising the step of positioning a sandwiched portion between the engaging portion and receiving portion prior to installation of the engaging portion.

11. The method of claim 10, further comprising the step of forming an aperture in the sandwiched portion and aligning with the inner rim edge of the receiving portion.

12. A method for forming and installing a fastener, comprising the steps of:
    forming an engaging portion having a projecting stem which is interiorly hollowed over at least an intermediate extending range, the stem including a solid end most extending portion;
    forming a receiving portion having a surface, within which is configured an inner rim defined edge, a diameter of an aperture between the rim edge being less than a diameter of the stem;
    constructing the receiving portion of a material having a greater flexibility than the engaging portion and so that the rim edge experiences a majority of deformation in response to insertion of the engaging portion;
    pressing the solid end most extending portion of the engaging portion through the inner rim edge of the receiving portion; and
    aligning with the inner rim edge a location of the interiorly hollowed portion of the stem, causing inward collapsing of the aligned location by the rim edge to secure the engaging portion to the receiving portion.

13. A method for forming and installing a fastener, comprising the steps of:
    forming an engaging portion having a projecting stem which is interiorly hollowed over at least an intermediate extending range, the stem including a solid end most extending portion;
    forming a receiving portion having a surface, within which is configured an inner rim defined edge, a diameter of an aperture between the rim edge being less than a diameter of the stem;
    constructing the receiving portion of a material having a similar stiffness and flexibility as the engaging portion and so that both the rim edge and the engaging portion experience a degree of deformation in response to insertion of the engaging portion
    pressing the solid end most extending portion of the engaging portion through the inner rim edge of the receiving portion; and
    aligning with the inner rim edge a location of the interiorly hollowed portion of the stem, causing inward collapsing of the aligned location by the rim edge to secure the engaging portion to the receiving portion.

* * * * *